US007171049B2

(12) United States Patent
Snapp (10) Patent No.: US 7,171,049 B2
(45) Date of Patent: Jan. 30, 2007

(54) METHOD AND APPARATUS FOR ALPHANUMERIC RECOGNITION

(75) Inventor: Robert F. Snapp, Memphis, TN (US)

(73) Assignee: United States Postal Service, Washington, DC (US)

(*) Notice: Subject to any disclaimer, the term of this patent is extended or adjusted under 35 U.S.C. 154(b) by 738 days.

(21) Appl. No.: 10/450,470

(22) PCT Filed: Dec. 13, 2001

(86) PCT No.: PCT/US01/47944

§ 371 (c)(1),
(2), (4) Date: Jun. 13, 2003

(87) PCT Pub. No.: WO02/48953

PCT Pub. Date: Jun. 20, 2002

(65) Prior Publication Data

US 2004/0032986 A1    Feb. 19, 2004

Related U.S. Application Data

(60) Provisional application No. 60/255,435, filed on Dec. 15, 2000.

(51) Int. Cl.
*G06K 9/64* (2006.01)
*G06K 9/00* (2006.01)
(52) U.S. Cl. ...................... 382/217; 382/101
(58) Field of Classification Search .............. 382/101, 382/102, 209, 217, 218
See application file for complete search history.

(56) References Cited

U.S. PATENT DOCUMENTS

| 4,058,795 A | 11/1977 | Balm |
| 4,088,981 A * | 5/1978 | Gott ........................... 382/313 |
| 4,308,523 A * | 12/1981 | Schapira ..................... 382/216 |
| 4,701,961 A * | 10/1987 | Hongo ........................ 382/218 |
| 5,392,212 A | 2/1995 | Geist |
| 5,703,783 A | 12/1997 | Allen et al. |
| 6,978,044 B2 * | 12/2005 | Akagi ......................... 382/187 |

FOREIGN PATENT DOCUMENTS

JP    2000-341572    12/2000

* cited by examiner

*Primary Examiner*—Daniel Mariam
(74) *Attorney, Agent, or Firm*—Finnegan, Henderson, Farabow, Garrett, & Dunner, L.L.P.

(57) ABSTRACT

A method and apparatus for recognizing alphanumeric characters in which a set of unknown characters is received from an imaging system and a set of known characters from a storage device. A first set of pairs of characters is created from the set of unknown characters (302) and a second set of pairs of characters is created from the set of known characters (304). A matrix is generated having a plurality of cells, each cell containing a pair of characters. The matrix is interrogated with the first set to generate a first result, and the matrix is interrogated with the second set to generate a second result (302, 304). The first result is compared with the second result (306). A first predetermined action is taken if the first result matches the second result, while a second predetermined action is taken if the first result does not match the second result (308).

46 Claims, 11 Drawing Sheets

Fig. 2

$$\begin{bmatrix} \# \\ A \\ B \\ \vdots \\ Z \end{bmatrix} \times [\# \ A \ B \ \cdots \ Z] = \begin{bmatrix} \#\# & A\# & \cdots & Z\# \\ \#A & AA & & ZA \\ \#B & AB & & ZB \\ \vdots & \vdots & & \vdots \\ \#Z & AZ & & ZZ \end{bmatrix} \leftarrow 305$$

(27 x 27 matrix)

Fig. 3a

$$\begin{bmatrix} \# \\ A \\ \vdots \\ Z \\ 0 \\ \vdots \\ 9 \end{bmatrix} \times [\# \ A \ \cdots Z \ 0 \cdots 9] \begin{bmatrix} \#\# & A\# & \cdots & 9\# \\ \#A & AA & & 9A \\ \vdots & \vdots & & \vdots \\ \#Z & AZ & & 9Z \\ \#0 & A0 & & 90 \\ \vdots & \vdots & & \vdots \\ \#9 & A9 & & 99 \end{bmatrix} \leftarrow 307$$

(37 x 37 matrix)

| ## | A# | B# | C# | D# | E# | F# | G# | H# | I# | J# | K# | L# | M# | N# | O# | P# | Q# | R# | S# | T# | U# | V# | W# | X# |
|---|---|---|---|---|---|---|---|---|---|---|---|---|---|---|---|---|---|---|---|---|---|---|---|---|
| #A | AA | BA | CA | DA | EA | FA | GA | HA | IA | JA | KA | LA | MA | NA | OA | PA | QA | RA | SA | TA | UA | VA | WA | XA |
| #B | AB | BB | CB | DB | EB | FB | GB | HB | IB | JB | KB | LB | MB | NB | OB | PB | QB | RB | SB | TB | UB | VB | WB | XB |
| #C | AC | BC | CC | DC | EC | FC | GC | HC | IC | JC | KC | LC | MC | NC | OC | PC | QC | RC | SC | TC | UC | VC | WC | XC |
| #D | AD | BD | CD | DD | ED | FD | GD | HD | ID | JD | KD | LD | MD | ND | OD | PD | QD | RD | SD | TD | UD | VD | WD | XD |
| #E | AE | BE | CE | DE | EE | FE | GE | HE | IE | JE | KE | LE | ME | NE | OE | PE | QE | RE | SE | TE | UE | VE | WE | XE |
| #F | AF | BF | CF | DF | EF | FF | GF | HF | IF | JF | KF | LF | MF | NF | OF | PF | QF | RF | SF | TF | UF | VF | WF | XF |
| #G | AG | BG | CG | DG | EG | FG | GG | HG | IG | JG | KG | LG | MG | NG | OG | PG | QG | RG | SG | TG | UG | VG | WG | XG |
| #H | AH | BH | CH | DH | EH | FH | GH | HH | IH | JH | KH | LH | MH | NH | OH | PH | QH | RH | SH | TH | UH | VH | WH | XH |
| #I | AI | BI | CI | DI | EI | FI | GI | HI | II | JI | KI | LI | MI | NI | OI | PI | QI | RI | SI | TI | UI | VI | WI | XI |
| #J | AJ | BJ | CJ | DJ | EJ | FJ | GJ | HJ | IJ | JJ | KJ | LJ | MJ | NJ | OJ | PJ | QJ | RJ | SJ | TJ | UJ | VJ | WJ | XJ |
| #K | AK | BK | CK | DK | EK | FK | GK | HK | IK | JK | KK | LK | MK | NK | OK | PK | QK | RK | SK | TK | UK | VK | WK | XK |
| #L | AL | BL | CL | DL | EL | FL | GL | HL | IL | JL | KL | LL | ML | NL | OL | PL | QL | RL | SL | TL | UL | VL | WL | XL |
| #M | AM | BM | CM | DM | EM | FM | GM | HM | IM | JM | KM | LM | MM | NM | OM | PM | QM | RM | SM | TM | UM | VM | WM | XM |
| #N | AN | BN | CN | DN | EN | FN | GN | HN | IN | JN | KN | LN | MN | NN | ON | PN | QN | RN | SN | TN | UN | VN | WN | XN |
| #O | AO | BO | CO | DO | EO | FO | GO | HO | IO | JO | KO | LO | MO | NO | OO | PO | QO | RO | SO | TO | UO | VO | WO | XO |
| #P | AP | BP | CP | DP | EP | FP | GP | HP | IP | JP | KP | LP | MP | NP | OP | PP | QP | RP | SP | TP | UP | VP | WP | XP |
| #Q | AQ | BQ | CQ | DQ | EQ | FQ | GQ | HQ | IQ | JQ | KQ | LQ | MQ | NQ | OQ | PQ | QQ | RQ | SQ | TQ | UQ | VQ | WQ | XQ |
| #R | AR | BR | CR | DR | ER | FR | GR | HR | IR | JR | KR | LR | MR | NR | OR | PR | QR | RR | SR | TR | UR | VR | WR | XR |
| #S | AS | BS | CS | DS | ES | FS | GS | HS | IS | JS | KS | LS | MS | NS | OS | PS | QS | RS | SS | TS | US | VS | WS | XS |
| #T | AT | BT | CT | DT | ET | FT | GT | HT | IT | JT | KT | LT | MT | NT | OT | PT | QT | RT | ST | TT | UT | VT | WT | XT |
| #U | AU | BU | CU | DU | EU | FU | GU | HU | IU | JU | KU | LU | MU | NU | OU | PU | QU | RU | SU | TU | UU | VU | WU | XU |
| #V | AV | BV | CV | DV | EV | FV | GV | HV | IV | JV | KV | LV | MV | NV | OV | PV | QV | RV | SV | TV | UV | VV | WV | XV |
| #W | AW | BW | CW | DW | EW | FW | GW | HW | IW | JW | KW | LW | MW | NW | OW | PW | QW | RW | SW | TW | UW | VW | WW | XW |
| #X | AX | BX | CX | DX | EX | FX | GX | HX | IX | JX | KX | LX | MX | NX | OX | PX | QX | RX | SX | TX | UX | VX | WX | XX |
| #Y | AY | BY | CY | DY | EY | FY | GY | HY | IY | JY | KY | LY | MY | NY | OY | PY | QY | RY | SY | TY | UY | VY | WY | XY |
| #Z | AZ | BZ | CZ | DZ | EZ | FZ | GZ | HZ | IZ | JZ | KZ | LZ | MZ | NZ | OZ | PZ | QZ | RZ | SZ | TZ | UZ | VZ | WZ | XZ |

METHOD AND APPARATUS FOR ALPHANUMERIC RECOGNITION

RELATED APPLICATION

The present application is related to and claims the priority of U.S. Provisional Application No. 60/255,435, filed Dec. 15, 2000, in the name of Robert Snapp, and entitled Method for Name Recognition for Optical Character Readers, the entire contents of which are fully incorporated herein by reference.

FIELD OF THE INVENTION

The present invention relates generally to an accelerated method and apparatus for recognizing alphanumeric characters, including those used to read mailpieces. In particular, the present invention relates to an accelerated method and apparatus for recognizing alphanumeric characters for sensing by optical character readers ("OCRs").

BACKGROUND OF THE INVENTION

Alphanumeric recognition systems are used in a variety of applications to read information with a machine rather than a pair of human eyes, thereby automating the process and increasing the efficiency of the throughput. Examples of machine-readable information include names or addresses written on mailpieces such as envelopes, information written on forms, such as tax forms and the census, product codes or part numbers inscribed on objects, and automobile VIN numbers.

OCR systems typically are used to sense, or "read," information under severe time constraints, such as when information must be read, interpreted, validated, updated, and/or processed within a short period of time. Working against this time constraint is the interpretation process, performed by character recognition schemes that resolve ambiguous patterns sensed by the OCR. For example, the character "D" could be read as an "O" or a "C," while a "G" could be read as a "C" or an "E." As a result, hundreds of permutations or combinations of characters may be cross-referenced against a known word or number using a character recognition scheme before the correct permutation is recognized.

A known character recognition scheme used with OCRs In the United States Postal Service ("USPS") to read names and addresses on mailpieces, such as letters, magazines, and parcels, is the DiGram scheme (Di=twice, Gram=letter). Using the DiGram scheme, the OCR interprets each character in the mail name (or mail address) as a letter (or number) and two alternate possibilities, creates a matrix of the possibilities, and generates permutations from the matrix. For a five-letter word, the matrix would be 3×5, and the number of permutations would be $3^5$, or 243, possible combinations of letters. The DiGram scheme determines the "valid" name or address, using a data recognition logic algorithm, by comparing the permutations to a known name or address with the same or similar character string.

For example, the DiGram scheme has been used to identify mailpieces requiring a change of address ("CoA"). About 500 to 700 of the approximately 40,000 pieces of mail per hour that pass through an OCR system require the application of a new address based on information from CoA forms. In the context of a mailpiece undergoing a match with a CoA form submitted by a postal patron, the mailpiece is read by the OCR, the mail name is split from the mail address, and the characters of the mail name are evaluated and matched against a known string of characters. This process must be completed within the time it takes to send the mail address to a ZIP+4 address matching engine for "standardization." Such standardization involves confirming that the city, state, and zip code in the mail address correspond to one another by checking them against a ZIP+4 database containing all corresponding city, state, and zip code information.

After the OCR reads and separates the mail name and mail address, it creates permutations of the mail name based on the DiGram scheme. A CoA form, which is the "known" data, contains the postal patron's name, old address, and new address. The permutations of the mail name are checked against the known CoA name or names associated with the mail address.

The DiGram scheme determines the correct mail name through a data recognition logic algorithm by comparing the permutations, which are generated from the three possible characters for each letter in the mail name, to the known CoA names for that particular mail address. If there is a match between the known name, a mail name permutation, and the old mail address, the USPS can assume that the mail belongs to a particular postal patron and forward it to the new address as requested in the CoA. The new address and corresponding barcode are then "sprayed," i.e., printed, on the mailpiece. If there is no match, the USPS can assume that the mail address written on the mailpiece by the sender is correct, and a barcode corresponding to the mail address written on the mailpiece is sprayed on the mailpiece.

The DiGram scheme requires a comparison of the known name against hundreds of permutations created by the DiGram scheme to recognize the correct name. Alphanumeric recognition could be more efficient if the method were accelerated by reducing the number of comparisons made.

SUMMARY OF THE INVENTION

In the alphanumeric character recognition method, a set of unknown characters is received from an imaging system and a set of known characters is received from a memory device. A first set of pairs of characters is then created from the set of unknown characters and a second set of pairs of characters is created from the set of known characters. A matrix is generated having a plurality of cells, wherein each cell of the plurality of cells contains a pair of characters. The plurality of cells of the matrix are interrogated with the first set of pairs of characters to generate a first result, and the plurality of cells of the matrix are interrogated with the second set of pairs of characters to generate a second result. The first result is compared with the second result. A first predetermined action is taken if the first result matches the second result, while a second predetermined action is taken if the first result does not match the second result.

The apparatus for recognizing alphanumeric characters comprises a scanner for imaging a set of unknown characters, a memory device comprising a database including a set of known characters, and a processor. The processor generates a first set of pairs of characters from the set of unknown characters and a second set of pairs of characters from the set of known characters. The processor also generates a matrix having a plurality of cells, wherein each cell of the plurality of cells contains a pair of characters. The processor interrogates the plurality of cells of the matrix with the first set of pairs of characters to generate a first result and interrogates the plurality of cells of the matrix with the second set of pairs of characters to generate a second result. The processor then compares the first result with the second result, and takes a first predetermined action if the first result matches the second result and a second predetermined action if the first result does not match the second result.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate the various features and aspects of the method and apparatus for alphanumeric recognition and, together with the description, serve to explain its advantages and principles.

In the drawings:

FIGS. 4a and 4b illustrate exemplary comparisons of a matrix interrogation by unknown characters and matrix interrogations by known characters, showing where a match is found between the unknown mail matrix and known CoA matrix in FIG. 4a, and where no is found match between the unknown mail matrix and the known CoA matrix in FIG. 4b;

FIG. 4c illustrates an exemplary result generated by a matrix interrogation of the known CoA name "SMITH";

FIG. 4d illustrates a comparison of the results from comparing FIGS. 4a and 4b;

FIG. 4e illustrates a comparison of FIGS. 4a and 4c;

DETAILED DESCRIPTION

Reference will now be made in detail to an implementation of the present invention as illustrated in the accompanying drawings. Wherever possible, the same reference numbers will be used throughout the drawings to refer to the same or like parts.

Figure 1:
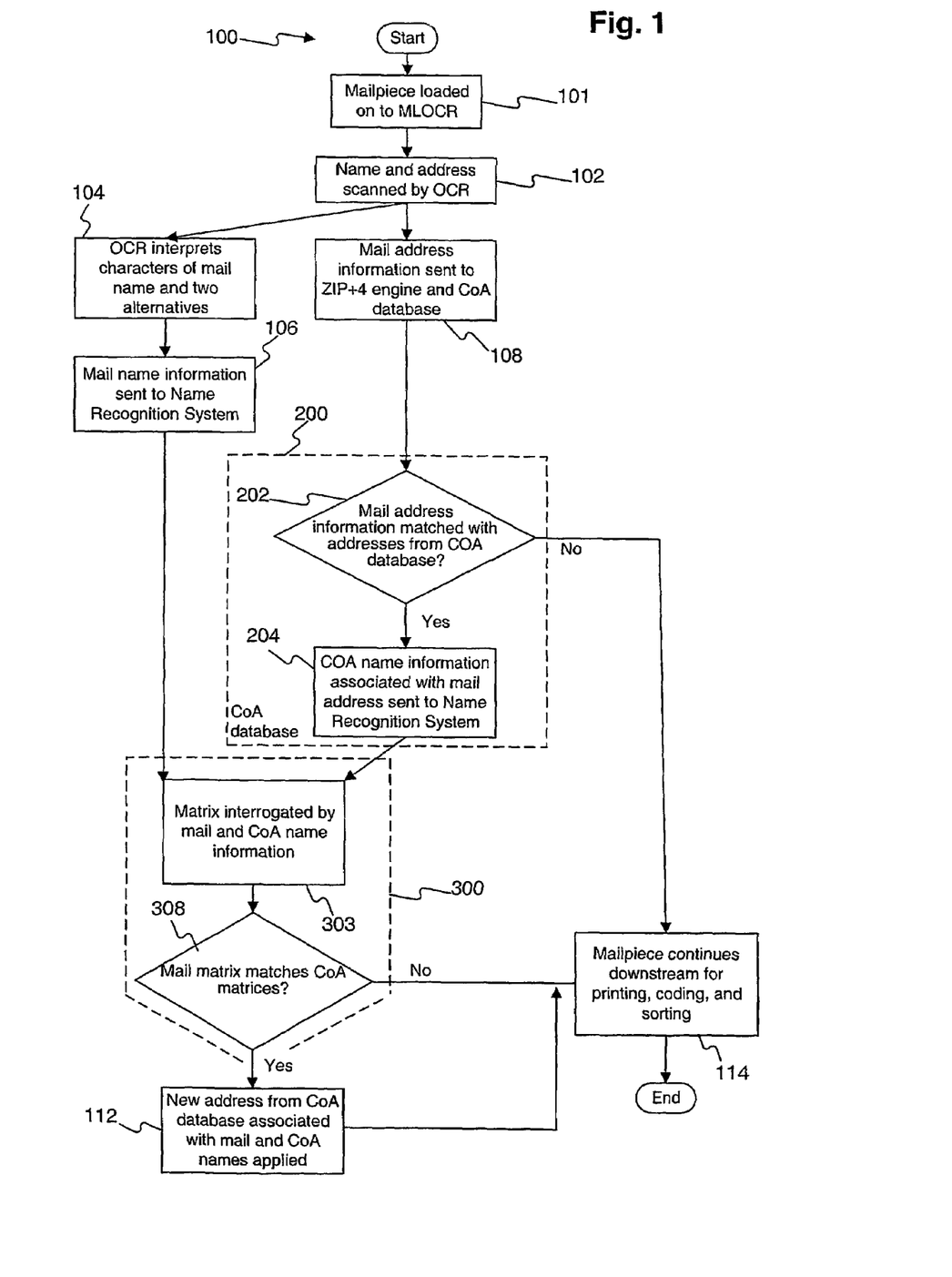
FIG. 1 is an exemplary flowchart of a mail sorting process suitable for use with an alphanumeric recognition method for optical character readers.

FIG. 1 is an exemplary flow chart of a mail sorting process 100 in which stages consistent with the alphanumeric recognition method may be implemented. Mail sorting process 100 utilizing character recognition systems such as DiGram are known in the art. Consistent with the objective of accelerating the recognition process, the following description of mail sorting process 100, encompassing a CoA database 200 and a Name Recognition System 300, includes a description of an accelerated alphanumeric recognition method. In mail sorting process 100, the alphanumeric recognition method is embodied in Name Recognition System 300.

Although the method is described with respect to mail sorting process 100, the present method of alphanumeric recognition can be implemented in any process in which alphanumeric characters are recognized, and is not limited to postal applications. Provided that each character is recognized as one of a limited number of possibilities and there is a known set of characters with which to compare unknown characters, the possibilities for the unknown characters may be compared against the known set of characters and the unknown characters may be determined.

As shown in FIG. 1, mail sorting process 100 begins with stage 101 in which mailpieces are loaded onto a multi-line optical character reader ("MLOCR"). In stage 102, an optical character reader ("OCR") or other character identification system images information, such as names and addresses, from objects, such as mailpieces. Imaged information could include, among other things: words representing names, streets, cities, and states; numbers representing zip codes and part numbers; and alphanumeric information representing numerical street addresses, product codes, automobile VIN numbers, and license plate numbers. The OCR scans the line where it assumes the name is located, and then scans the line or lines where it assumes the address is located (stage 101). The imaging mechanism need not be an OCR, but must be able to identify a character and interpret it as a limited number of possibilities. Other possibilities include, but are not limited to, bar code scanners, biometrics, hand held scanners, and video camera or photography systems.

Following imaging stage 102, the data assumed to represent a mail name enters interpretation stage 104, in which the OCR interprets each letter of the mail name as either a specific character or two alternate possible characters. A method utilizing more than three possible characters may be implemented, but as the number of possibilities increase, the number of iterations of pairs of characters used in interrogating a matrix also will increase, as will the time it takes to determine whether a match exists and to verify the correct mail name. In the described embodiment, it has been determined that identifying three possible characters for each letter of a mail name is suitable for the OCRs used in mail processing system 100, as the accuracy of the OCR identification of three possibilities is adequate. Any benefit in the described application of using more than three possibilities is outweighed by the time lost in performing additional matrix interrogations. In other applications, however, a greater or lesser number of possible characters might be used.

In stage 106, the possibilities for each character in the mail name are sent to Name Recognition System 300. Simultaneously, in stage 108, data assumed to represent mail address from imaging stage 102 is sent to a ZIP+4 engine. The ZIP+4 engine takes a mail address and matches it against a ZIP+4 database. This ZIP database contains ranges of addresses on streets within a city, state, and zip code. The ZIP database attempts to standardize the elements of an address and ensure that that the address exists in that city, state, and five digit zip code. The database also provides a "plus 4" add-on zip code, a carrier identification number, and a two-digit delivery point code that are useful for the subsequent printing, coding, and sorting stages (114).

Mail address information from the ZIP+4 engine is processed by CoA database 200 to determine if the mail address matches CoA address information stored in CoA database 200 (stage 202). Stored information may include first and last names, old and new addresses, and dates of moves provided on CoA forms and entered into CoA database 200. If the mail address matches address information from a CoA form in CoA database 200 as determined at stage 202, then the name or names in CoA database 200 associated with the mail address are sent to Name Recognition System 300, as shown in stage 204. If there is no CoA address in CoA database 200 that matches the mail address in stage 202, presumably the mailpiece is addressed correctly and the mailpiece is sent downstream for printing, coding, sorting, and further processing (stage 114).

Figure 2:
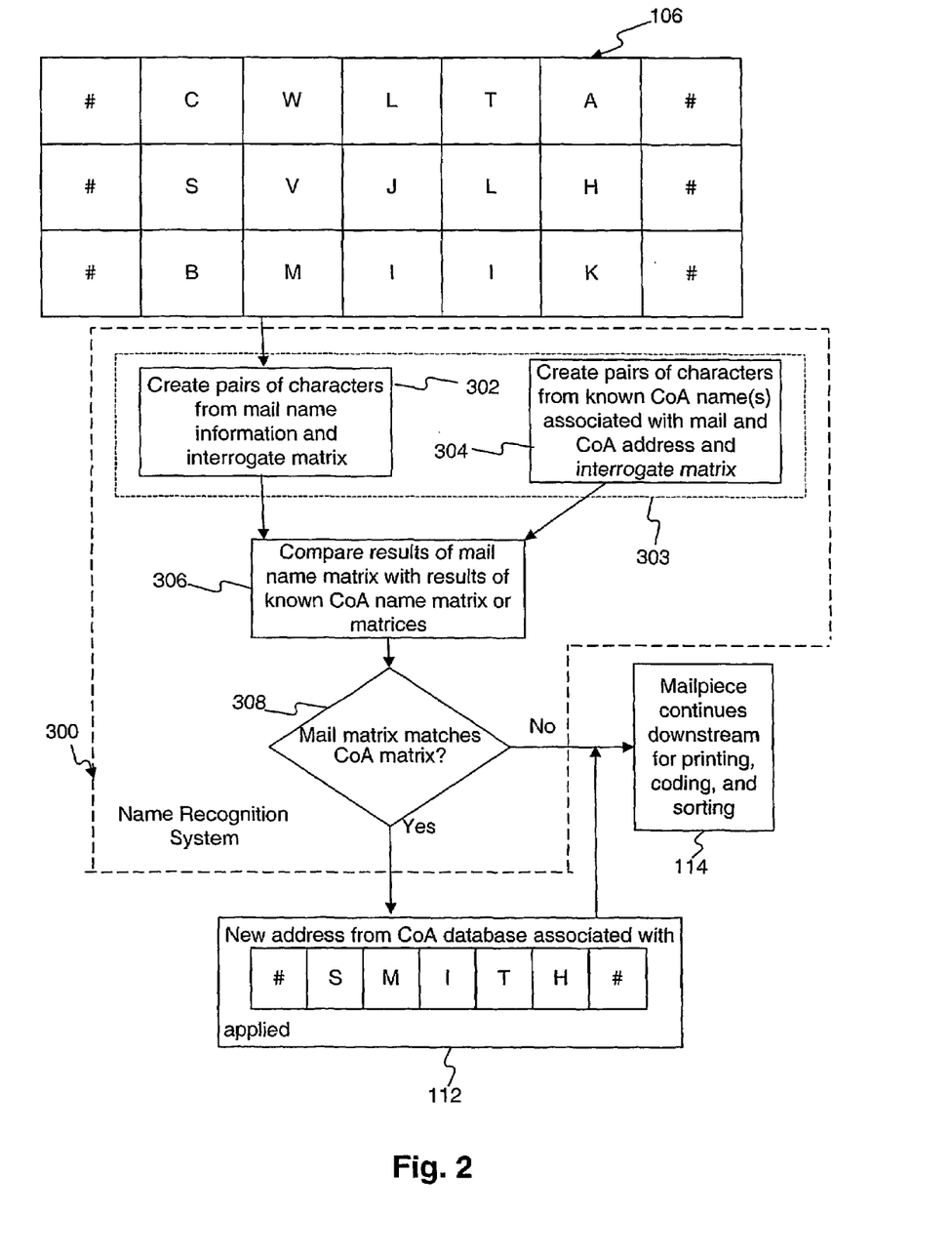
FIG. 2 is an exemplary flowchart of a name recognition logic method for optical character readers.

If there is a match in stage 202, Name Recognition System 300 uses the mail name information from stage 106 and the CoA name information from stage 204 to create pairs of characters and interrogate an alphanumeric matrix (stage 303), a process described in more detail with respect to FIGS. 2–4. If the mail matrix matches the CoA matrix at stage 308 of FIG. 2, then a new address is sprayed on the mailpiece at stage 112. The new address, which is obtained from CoA database 200, is the new address corresponding to the CoA name that matches the mail name and the old mail address (at stage 202). If the matrices do not match, the mailpiece continues downstream, as shown in stage 114, for printing, coding, sorting, and further processing.

An example, for demonstrative purposes only, is useful for describing the alphanumeric recognition method utilized by Name Recognition System 300. Assume postal patrons John Smith and Jane Doe have submitted CoA forms and the information has been entered into the CoA database. John Smith moved from an address in Beverly Hills, Calif. to an address in Long Beach, Calif., while Jane Doe moved from the same address in Beverly Hills, Calif. to an address in San Diego, Calif.

Following the method shown in FIG. 1, a mailpiece addressed to John Smith at his Beverly Hills address is loaded (stage 101) and imaged (stage 102), his mail name "SMITH" is interpreted by the OCR (stage 104), the possible characters are sent to the Name Recognition System 300 (stage 106), and his mail address is sent to the ZIP+4 engine (stage 108).

The ZIP+4 engine standardizes the Beverly Hills address by ensuring that the city, state, and zip code correspond to one another, and sends the Beverly Hills address to CoA database 200. CoA database 200 contains CoA information from forms submitted by postal patrons such as John Smith. In stage 202, the database is queried for the Beverly Hills address. If a match is found, the name or names in the CoA database 200 corresponding to the Beverly Hills address, in the present example SMITH and DOE, are sent in stage 204 to Name Recognition System 300.

Utilizing the alphanumeric recognition method, Name Recognition System 300 accelerates the time required to determine if a mailpiece requires a change of address to be applied. As noted, it is contemplated that the alphanumeric recognition method may be used in any process in which alphanumeric characters are recognized. Provided that each character is recognized as one of a limited number of possibilities and there is a known set of characters with which to compare the unknown characters, the method disclosed may be used to compare these possibilities against the known set of characters, and the unknown characters may be determined.

Figure 3A:
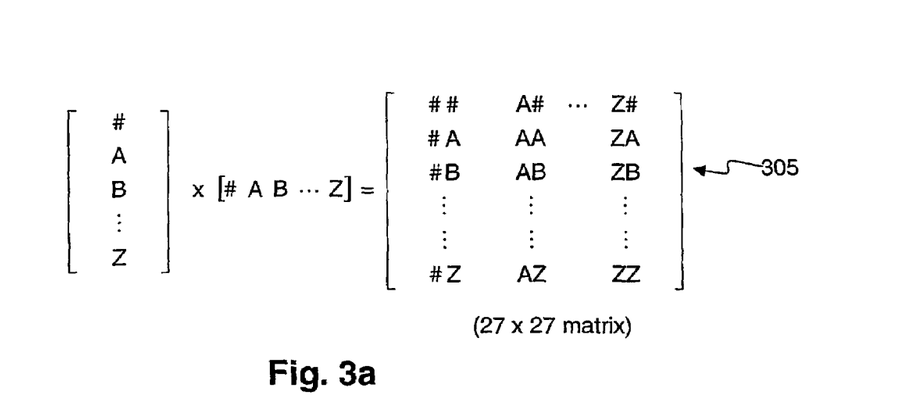
FIGS. 3a and 3b are respective exemplary alphabetic and alphanumeric matrices used in the alphanumeric recognition method.
Figure 3B:
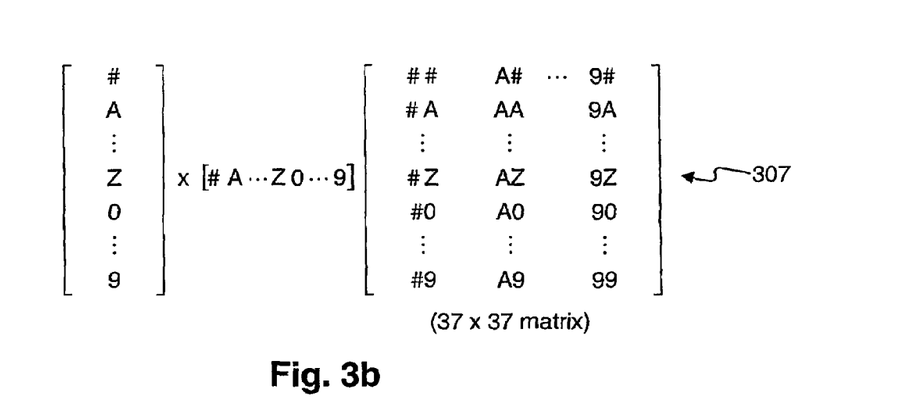

Continuing with the SMITH example for demonstrative purposes, the alphanumeric recognition method is described in detail with respect to FIGS. 2–4. FIG. 2 illustrates Name Recognition System 300 for mail sorting process 100 utilizing the alphanumeric recognition method. Although SMITH is used in FIG. 2 to demonstrate the method, it should be understood that a method similar to that shown in FIG. 2 is followed for DOE, the other CoA name previously associated with the mail address in CoA database 200.

After sensing each of the letters in "SMITH" as a "primary" letter and two alternate possibilities in stage 104, the mail name information is sent to Name Recognition System 300, shown in FIG. 2 as stage 106. As noted, a method utilizing more than three possible characters may be implemented, depending on the accuracy of the imaging or scanning system, but the benefits of evaluating more than a very limited number of possible characters for each letter must be weighed against the time lost in performing additional matrix interrogations. For mail sorting process 100 utilizing a multi-line OCR ("MLOCR") (stage 101), it has been demonstrated that three possibilities is sufficient. In addition to interpreting each "primary" character and two alternate possibilities for each character in the mail name, the OCR or other imaging system identifies a space (indicated as "#" in FIG. 2) at the beginning and end of each word to differentiate similar words or names, such as SMITH, BLACKSMITH, SMITHFIELD, etc.

From the possible characters, Name Recognition System 300 employs algorithms to create pairs of characters from the mail name (stage 106) and interrogate a matrix, shown in FIG. 2 as stage 302. The character pairs used to interrogate the matrix are determined from the possibilities. For the first two characters of the mail name. (which is actually #SMITH#, although the imaging system is not aware of this), the pairs are #C, #S, #B, based on the possibilities the OCR interpreted for what is actually the pair #S, as shown in columns 1 and 2 of stage 106 in FIG. 2. The pairs for the second and third characters of the mail name are CW, CV, CM, SW, SV, SM, BW, BV, and BM, based on the possibilities shown in columns 2 and 3 of stage 106. The pairs for the third and fourth characters of the mail name, from columns 3 and 4 of stage 106 in FIG. 2, are WL, WJ, WI, VL, VJ, VI, ML, MJ, and MI. This process continues until 44 pairs of character sets are created, one for each possible combination of two characters given the three possibilities per character and including the spaces before and after the mail name.

At this point in the alphanumeric recognition method, the stage of matrix interrogation begins (stage 303 in FIGS. 1 and 2). Name Recognition System 300 generates a matrix of alphabetic, numeric, or alphanumeric pairs of characters. Alphabetic and alphanumeric matrices are shown generally in FIGS. 3a and 3b. FIG. 3a is a 27×27 alphabetic matrix 305 suitable for use in processes, such as mail sorting process 100, in which a set of characters (mail name) must be matched against known characters (names in CoA database 200), and the characters are exclusively letters. Similarly, FIG. 3b is a 37×37 alphanumeric matrix 307 that could be used in the same stages for matching addresses, product codes, and other forms of information in which a set of known characters, to include numbers and letters, is compared against an unknown set of characters read by a imaging or scanning system, such as an OCR. Although the exemplary description is based on the English alphabet and numerical system, it is contemplated that the alphanumeric recognition method can be used for any alphabetic and numerical systems.

As shown using the SMITH example and consistent with the present alphanumeric character recognition method, FIGS. 4a–4e illustrate a comparison of the matrix (stage 306 in FIG. 2) interrogated by the character pairs generated from the unknown mail name in stage 302 of FIG. 2 against the matrix interrogated by the known CoA names SMITH and DOE in stage 304 of FIG. 2.

FIG. 4a is the result generated by a matrix interrogation of the unknown character pairs from the mail name (stage 302). Cells of the 27×27 matrix that correspond to each of the 44 character pairs #C, #S, #B, CW, CV, CM, SW, SV, SM, BW, BV, BM, WL, WJ, WI, VL, VJ, VI, ML, MJ, MI, etc. from the unknown mail name are checked off on one matrix, indicated in FIG. 4a by bold lines around the cell.

FIG. 4b is the result generated by a matrix interrogation of the known CoA name "SMITH." The cells of the 27×27 matrix that correspond to each of the character pairs from the known CoA name SMITH (#S, SM, MI, IT, TH, H#) are checked off this matrix, indicated in FIG. 4b by a gray background.

FIG. 4c is the result generated by a matrix interrogation of the second, known CoA name "DOE." Recall that John Smith and Jane Doe shared a Main Street, Beverly Hills address before each moved to a separate address. The cells of the 27×27 matrix that correspond to each of the character pairs from the known CoA name DOE (#D, DO, OE, E#) are checked off this matrix, indicated in FIG. 4c by a gray background.

FIG. 4d is a comparison of the results from the matrix interrogation of character pairs from the unknown mail name possibilities against the results from the matrix interrogation of character pairs from the known name "SMITH." In other words, FIG. 4d illustrates the results of comparing FIG. 4a and FIG. 4b.

Similarly, FIG. 4e is a comparison of the results from the matrix interrogation of character pairs from the unknown mail name possibilities against the results from the matrix interrogation of character pairs from the known name DOE (#D, DO, EO, E#), i.e., a comparison of FIG. 4a and FIG. 4c.

A match occurs when some of the cells "checked off" during the matrix interrogation by the unknown mail name character pairs (stage 302) are the same as the cells "checked off" during the matrix interrogation by the CoA name character pairs (stage 304). Matches are indicated in FIG. 4d by cells with both bold borders and a gray background. The order of the character pairs that match is irrelevant. If all the known CoA name character pairs match some of the unknown mail name character pairs, the possibility of another mail name with the same character pairs matching the known name character pairs is small. Moreover, the possibility of a match is made less likely by the fact that the CoA name was selected from CoA database 200 using the mail address (stage 202). Thus, when the cells of a mail name matrix and a CoA name matrix align (stage 308), as in FIG. 4d, the match is assumed and the unknown mail name is presumed to be the same as the known CoA name.

If there is a match when the "unknown" matrix is compared against the "known" matrices using the alphanumeric character recognition method in stage 308, the new (Long Beach) address for the postal customer (John Smith) from CoA database 200 is applied, as discussed previously with respect to stage 112 in FIG. 1, before the mailpiece is sent downstream and ultimately delivered to the new (Long Beach) address (stage 114). If there is no match, presumably the mail address on the mailpiece is correct and the mailpiece is sent downstream for further processing (stage 114). For example, as shown in FIG. 4e, the matrix interrogation from the unknown mail name did not match the matrix interrogation from the known CoA name DOE. If there had not been a match with the matrix interrogated by known CoA name #SMITH#, the mailpiece would have continued downstream for ultimate delivery to the mail address (Beverly Hills) written by the sender on the front of the mailpiece. However, because there was a match, John Smith's new Long Beach address is sprayed on the mailpiece, and it is further processed for delivery to the new address.

Figure 5:
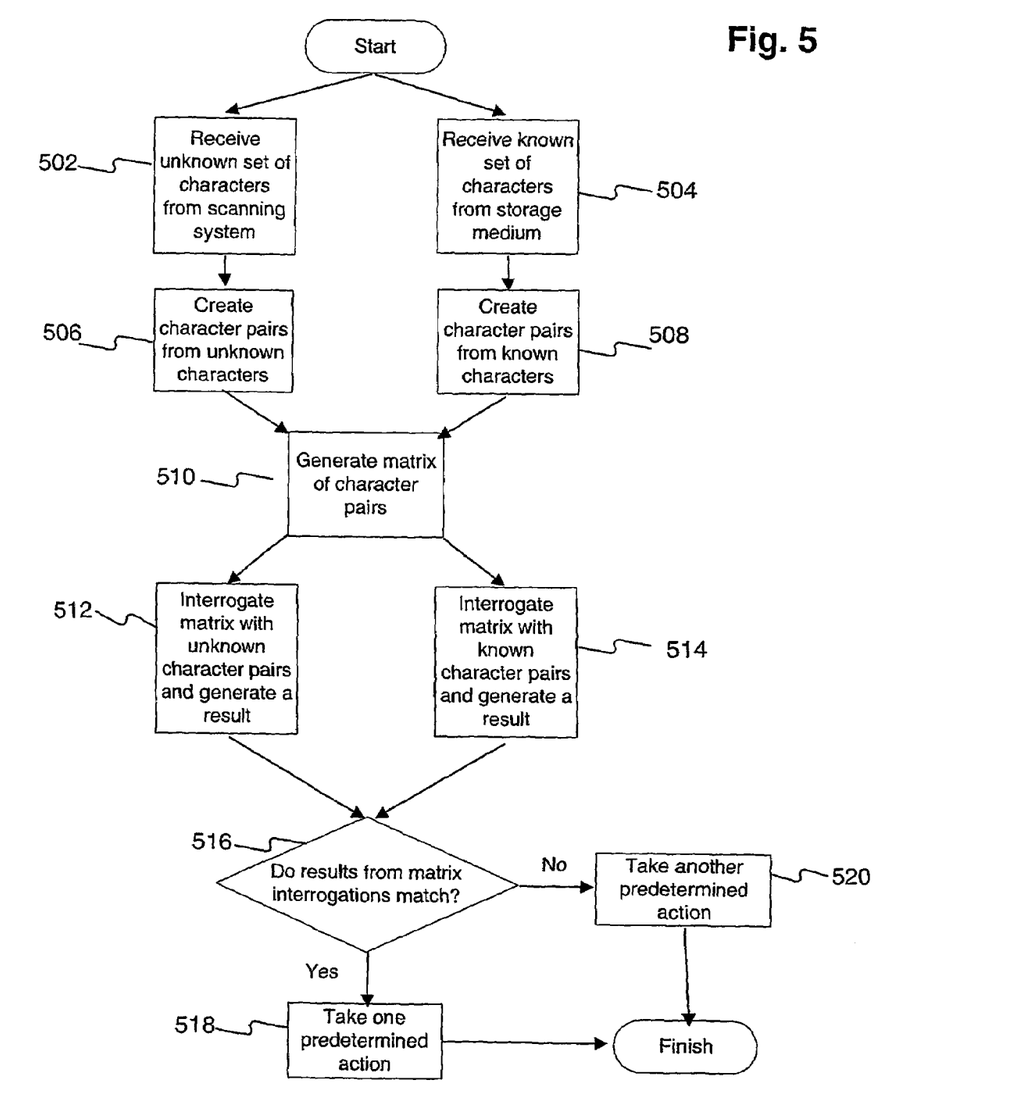
FIG. 5 is an exemplary flowchart of an alphanumeric recognition method.

FIG. 5 is an exemplary flow chart of an alphanumeric character recognition method. Although the matrix interrogations are illustrated in parallel processes, they do not have to be done simultaneously and may be performed sequentially.

At stage 502, a set of unknown characters, such as the primary characters in a mail name written on a mailpiece and the two possible alternate characters for each primary character, is received from an imaging or scanning system, such as an OCR. At stage 504, a set of known characters, such as name submitted on a CoA form, is received from a memory device, such as a hard drive, read only memory ("ROM") or other medium storing records, such as the CoA database.

A first set of pairs of characters is then created in stage 506, as previously described with respect to FIG. 2, from the set of unknown characters. Similarly, at stage 508, a second set of pairs of characters is created from the set of known characters.

A matrix is generated in stage 510 that has a plurality of cells. The matrix may be alphabetic (FIG. 3a), numeric, or alphanumeric (FIG. 3b). Each cell of the plurality of cells contains a pair of characters, as shown by example in FIG. 4a.

At stage 512, the plurality of cells of the matrix are interrogated with the first set of pairs of characters to generate a first result (FIG. 4a), and the plurality of cells of the matrix are interrogated with the second set of pairs of characters to generate a second result (FIGS. 4b and 4c).

The first result is compared with the second result at stage 516. FIGS. 4d and 4e illustrate such a comparison of results of matrix interrogations. FIG. 4d shows a comparison of results using character pairs for an unknown name and known name SMITH, and FIG. 4e shows a comparison of results using character pairs from an unknown name and known name DOE.

A first predetermined action is taken if the first result matches the second result, as shown at stage 518. For example, if the matrices for the known CoA name and the unknown mail name match, a new address is applied to the mailpiece and it is ultimately sorted and delivered to the new address. Meanwhile, a second predetermined action is taken at stage 520 if the first result does not match the second result. For example, if the matrices for known CoA names and an unknown mail name do not match, a new address is not sprayed on the mailpiece because the USPS assumes there was no CoA form submitted, the mailpiece is sent for further sorting, and ultimately it is delivered to the address written on its face.

Figure 6:
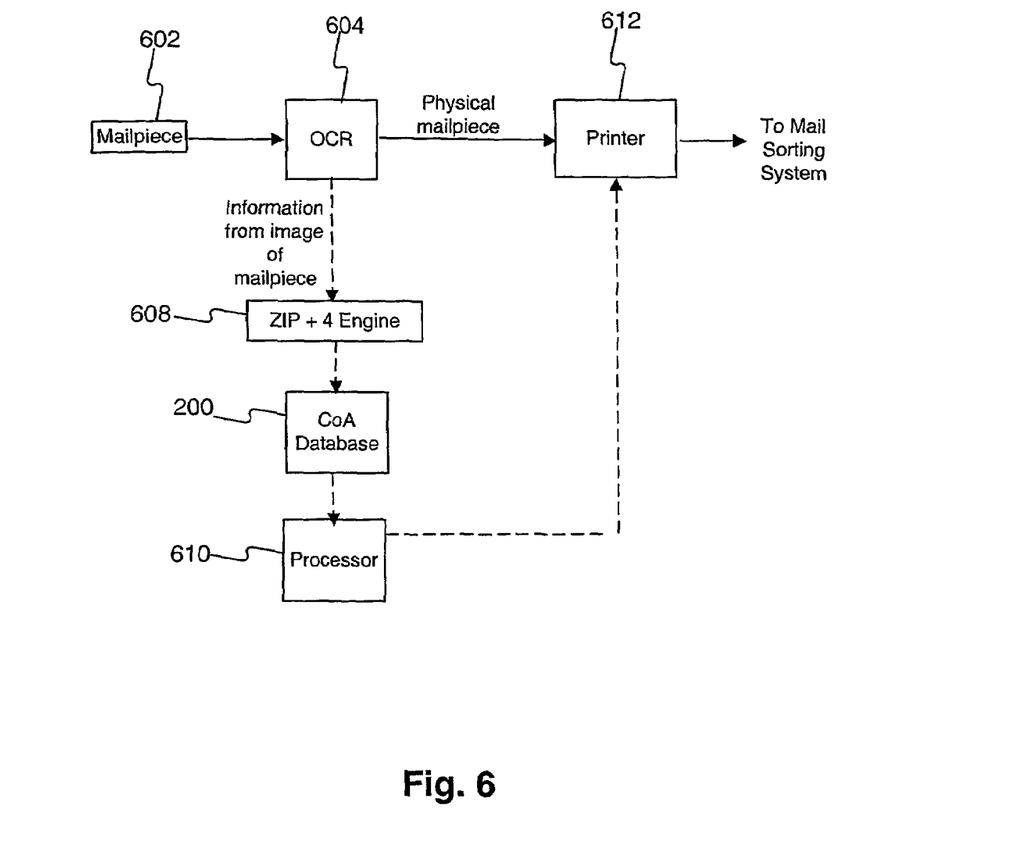
FIG. 6 is an exemplary apparatus for recognizing alphanumeric characters.

FIG. 6 illustrates an exemplary apparatus for recognizing alphanumeric characters. Mailpiece 602 is loaded onto OCR 604, which images a name and address from mailpiece 602. While mailpiece 602 is conveyed toward subsequent components of a mail sorting system, an image of the name and address on mailpiece 602 is sent to a ZIP+4 engine 606 and a CoA database 200.

ZIP+4 engine 606 takes a mail address and matches it against a ZIP+4 database. As previously discussed, the ZIP+4 database attempts to standardize the elements of an address to ensure that the particular address exists in the particular city, state, and five digit zip code. The ZIP+4 database also provides a "plus 4" add-on zip code, a carrier identification number, and a two-digit delivery point code that are needed for subsequent sorting stages.

CoA database 200 processes mail address information from ZIP+4 engine 606 to determine if the mail address matches COA information stored in COA database 200. As discussed with respect to FIG. 1, if there is a match between the mail address information from a CoA form entered into CoA database 200, then the name or names in CoA database 200 associated with the mail address are sent to a processor 610. If there is no CoA address in CoA database 200 that matches the mail address from ZIP+4 engine 606, the USPS assumes that the mailpiece is addressed correctly.

If there is a match, processor 610 generates one set of pairs of characters from the mail name imaged by OCR 604 and generates another set of pairs of characters from the CoA name or names sent by CoA database 200. Processor 610 also generates an alphanumeric matrix of character pairs, as previously described with respect to FIGS. 2–4. Processor 610 then interrogates the matrix, first with the mail name sets of character pairs, generating one result, and again with each of the sets of character pairs associated with the CoA name or names, generating additional results depending on the number of CoA names, as discussed with respect to FIGS. 4a–4e.

If the result of the mail matrix interrogation matches one of the results from the CoA matrix interrogation, then a printer 612 sprays on a new address on mailpiece 602. The new address, which is obtained from CoA database 200, is the new address corresponding to the CoA name that matches the mail name and the old mail address. Once the new address is applied, mailpiece 602 continues downstream to subsequent components of the sorting system for further sorting to its final destination, the new address.

If result of the mail matrix interrogation does not match one of the results from the CoA matrix interrogation, printer 612 does not spray on a new address, and mailpiece 602 continues downstream to subsequent components of the sorting system for further sorting to its final destination, the old mail address that the sender wrote on the face of mailpiece 602.

Additional exemplary predetermined actions involve other types of imaged information. For example, imaging systems, such as cameras, are used at traffic signals and toll booths to photograph license plates of a vehicles involved in traffic violations. The image of the license plate is read by a scanner. Using character creation and matrix interrogation, the license plate number is matched against a database of known license plates, names of vehicle owners, and their addresses. If a match exists, a citation could be sent to the vehicle owner. Similarly, the method of alphanumeric recognition can be used for any imaged information that can be compared against a known standard, including but not limited to addresses, part numbers, product and bar codes, and VIN numbers.

Other embodiments will be apparent to those skilled in the art from consideration of the specification and practice of the method disclosed herein. It is intended that the specification and examples be considered as exemplary only, with a true scope and spirit of the method being indicated by the following claims.

What is claimed is:

1. A method of alphanumeric character recognition, comprising:
    receiving a set of unknown characters from an imaging system;
    receiving a set of known characters from a memory device;
    creating a first set of pairs of characters from the set of unknown characters;
    creating a second set of pairs of characters from the set of known characters;
    generating a matrix having a plurality of cells, wherein each cell of the plurality of cells contains a pair of characters;
    interrogating the plurality of cells of the matrix with the first set of pairs of characters and generating a first result;
    interrogating the plurality of cells of the matrix with the second set of pairs of characters and generating a second result;
    comparing the first result with the second result;
    taking a first predetermined action if the first result matches the second result; and
    taking a second predetermined action if the first result does not match the second result.

2. The method of claim 1, wherein the imaging system comprises a scanner.

3. The method of claim 1, wherein the imaging system comprises a camera.

4. The method of claim 3, wherein the imaging system comprises a video camera.

5. The method of claim 1, wherein the imaging system comprises an optical character reader.

6. The method of claim 1, wherein the memory device comprises a database.

7. The method of claim 6, wherein the database stores data that is known.

8. The method of claim 6, wherein the database stores data from a plurality of change of address forms.

9. The method of claim 8, wherein the data comprises a name, an old address, and a new address.

10. The method of claim 8, wherein the set of unknown characters represents a name from a mailpiece imaged by the imaging system and the set of known characters represents a name from a change of address form.

11. The method of claim 8, wherein the matrix comprises an alphabetic matrix.

12. The method of claim 8, wherein the matrix comprises an alphanumeric matrix.

13. The method of claim 9, wherein the first action comprises applying the new address stored in the database to the mailpiece.

14. The method of claim 9, wherein the second action comprises sending the mailpiece for further processing.

15. The method of claim 6, wherein the database stores data from a plurality of license plates.

16. The method of claim 15, wherein the set of unknown characters represents a license plate number from a license plate imaged by the imaging system and the set of known characters represents a license plate number for a vehicle.

17. The method of claim 16, wherein the first action comprises issuing a citation to an owner of the vehicle.

18. The method of claim 16, wherein the second action comprises sending the license plate number for further processing.

19. The method of claim 6, wherein the database stores information comprising part numbers.

20. The method of claim 19, wherein the set of unknown characters represents a part number on a part that is imaged by the imaging system and the set of known characters represents a part number for a known part.

21. The method of claim 6, wherein the database stores information comprising product codes.

22. The method of claim 21, wherein the set of unknown characters represents a product code on a product that is imaged by the imaging system and the set of known characters represents a product code for a known product.

23. The method of claim 6, wherein the database stores information comprising vehicle identification numbers.

24. The method of claim 23, wherein the set of unknown characters represents a vehicle identification number that is imaged by the imaging system and the set of known characters represents a known vehicle identification number of a vehicle.

25. The method of claim 6, wherein the database stores a plurality of information comprising data about people.

26. The method of claim 25, wherein the plurality of information comprising data about people further comprises names, addresses, social security numbers, telephone numbers, and email addresses.

27. The method of claim 26, wherein the set of unknown characters represents a plurality of information on a form that is imaged by the imaging system and the set of known characters represents the plurality of information comprising data about people stored in the database.

28. The method of claim 1, wherein the matrix comprises an alphanumeric matrix.

29. The method of claim 1, wherein the matrix comprises an alphabetic matrix.

30. The method of claim 1, wherein the matrix comprises a numeric matrix.

31. A method of name recognition, comprising:
loading at least one mailpiece onto a scanner;
scanning a mail name and a mail address from the at least one mailpiece;
interpreting a plurality of characters from the mail name;
sending the mail address to a database comprising change of address information;
comparing the mail address with the change of address information;
determining a change of address name from the database, wherein the change of address name corresponds to the mail address and an old address from the change of address information;
creating a first set of pairs of characters from the plurality of characters comprising the mail name;
creating a second set of pairs of characters from the change of address name;
generating a matrix having a plurality of cells, wherein each cell contains a pair of characters;
interrogating the plurality of cells of the matrix with the first set of pairs of characters and generating a first result;
interrogating the plurality of cells of the matrix with the second set of pairs of characters and generating a second result;
comparing the first result with the second result;
printing a new address from the change of address information on the at least one mailpiece if the first result matches the second result; and
sending the at least one mailpiece downstream for further processing if the first result does not match the second result.

32. An apparatus for recognizing alphanumeric characters, comprising:
a scanner for imaging a set of unknown characters;
a memory device comprising a database including a set of known characters; and
a processor, wherein the processor:
generates a first set of pairs of characters from the set of unknown characters and a second set of pairs of characters from the set of known characters;
generates a matrix having a plurality of cells, wherein each cell of the plurality of cells contains a pair of characters,
interrogates the plurality of cells of the matrix with the first set of pairs of characters to generate a first result and interrogates the plurality of cells of the matrix with the second set of pairs of characters to generate a second result;
compares the first result with the second result; and
takes a first predetermined action if the first result matches the second result and a second predetermined action if the first result does not match the second result.

33. The apparatus of claim 32, wherein the scanner comprises a video camera.

34. The apparatus of claim 32, wherein the scanner comprises an optical character reader.

35. The apparatus of claim 32, wherein the database stores data from a plurality of change of address forms.

36. The apparatus of claim 35, wherein the data comprises a name, an old address, and a new address.

37. The apparatus of claim 35, wherein the set of unknown characters represents a name from a mailpiece imaged by the scanner and the set of known characters represents a name from a change of address form.

38. The apparatus of claim 35, wherein the matrix comprises an alphabetic matrix.

39. The apparatus of claim 35, wherein the matrix comprises an alphanumeric matrix.

40. The apparatus of claim 36, wherein the first action comprises applying the new address stored in the database to the mailpiece.

41. The apparatus of claim 40, wherein a printer applies the new address.

42. The apparatus of claim 36, wherein the second action comprises sending the mailpiece for further processing.

43. The apparatus of claim 32, wherein the matrix is an alphanumeric matrix.

44. The apparatus of claim 32, wherein the matrix is an alphabetic matrix.

45. The apparatus of claim 32, wherein the matrix is a numeric matrix.

46. An apparatus for recognizing alphanumeric characters, comprising:
a scanner for imaging a set of unknown characters;
a memory device comprising a database including a set of known characters; and
a processing means for:
generating a first set of pairs of characters from the set of unknown characters and a second set of pairs of characters from the set of known characters;
generating a matrix having a plurality of cells, wherein each cell of the plurality of cells contains a pair of characters;
interrogating the plurality of cells of the matrix with the first set of pairs of characters to generate a first result and interrogating the plurality of cells of the matrix with the second set of pairs of characters to generate a second result;
comparing the first result with the second result; and
taking a first predetermined action if the first result matches the second result and a second predetermined action if the first result does not match the second result.

* * * * *